United States Patent [19]

Salzman et al.

[11] 3,924,180
[45] Dec. 2, 1975

[54] POTENTIAL SENSING CELL ANALYZER

[75] Inventors: Gary C. Salzman; James R. Coulter; Paul F. Mullaney; Richard D. Hiebert, all of Los Alamos, N. Mex.

[73] Assignee: The United States of America as represented by the United States Energy Research and Development Administration, Washington, D.C.

[22] Filed: Oct. 12, 1973

[21] Appl. No.: 406,053

[52] U.S. Cl. ............................... 324/71 CP; 324/64
[51] Int. Cl.² .................. G01N 27/00; G01R 27/14
[58] Field of Search ........................... 324/71 CP, 64

[56] References Cited
UNITED STATES PATENTS

| | | | |
|---|---|---|---|
| 2,871,445 | 1/1959 | Carter et al. | 324/64 X |
| 3,648,158 | 3/1972 | Parker | 324/71 CP |
| 3,665,302 | 5/1972 | Lees et al. | 324/64 |
| 3,771,058 | 11/1973 | Hogg | 324/71 CP |

FOREIGN PATENTS OR APPLICATIONS

| | | | |
|---|---|---|---|
| 274,474 | 6/1970 | U.S.S.R. | 324/71 CP |

Primary Examiner—R. V. Rolinec
Assistant Examiner—R. Hille
Attorney, Agent, or Firm—John A. Horan; Robert W. Weig

[57] ABSTRACT

The disclosure relates to an apparatus and method for electrically analyzing biological cells. An orifice having two potential sensing electrodes is immersed in a container of saline solution in which cells to be analyzed are suspended. The entrance of the orifice communicates with the saline solution and the exit of the orifice communicates with a device for evacuating the cell containing saline solution through the orifice. Two potential sensing electrodes embedded in the orifice are connected to a high impedance differential amplifier which outputs to a pulse-height analyzer and a display or recording device. In operation, a source of current is applied to the orifice through external power electrodes to provide an electrical potential across the electrodes. Cells within the solution passing through the orifice vary the resistance between the electrodes and hence the potential difference between the electrodes. The high impedance differential amplifier amplifies this change in potential difference so that it can be received by the pulse height analyzer and recorded or displayed.

6 Claims, 3 Drawing Figures

POTENTIAL SENSING CELL ANALYZER

The invention described herein was made in the course of, or under, a contract with the U.S. Atomic Energy Commission.

FIELD OF THE INVENTION

The invention relates to cellular analysis and more particularly to an apparatus and method for electrical potential cell analysis.

BACKGROUND OF THE INVENTION

In cytology, there is an ever-increasing demand for automatic cellular counting, volumetric differentiation and analysis. At the present time, screening of cytological material such as for the detection of cancerous or malignant cells, and for sizing and counting the cells present in a particular amount of material, is manually accomplished by a two level screening process. The cells are first pre-screened visually by an observer capable of determining which samples apparently contain abnormal cells and to determine the size cell one hopes to count within a sample. The abnormal cell-containing samples are then examined by a trained cytotechnologist or pathologist who makes a final determination as to whether the cells of these samples are indeed cancerous. This method fairly accurately finds cancerous cells but it has a number of disadvantages. First, it is slow, requiring considerable technician time. Second, it is costly due to the human time involved. Third, it is non-quantitative in that the criteria of abnormality as well as the amount of cells present in a particular volumetric sample are primarily subjective. Because of the time and costs involved, it is generally not practicable to examine large populations of individuals using these prior art techniques.

In addition, most of the cellular specimens examined by a medical laboratory are normal. Therefore, the level of alertness and interest of those who do the screening is difficult to maintain. For example, in cytological examination for uterine cervical carcinoma, 98 percent of the women examined do not have cancer. Thus, personnel turnover may tend to be high and the test results become less quantitative and more costly.

It is therefore desirable to have a system for automatically determining the volumetric distribution of a sample of cells. One reason is that the output can be used to normalize light signals from a cell analyzer such as that disclosed in U.S. patent application Ser. No. 366,892 to Mullaney et al. filed June 4, 1973.

Presently, the most common type of prior art electrical analysis devices utilize a simple orifice with two electrodes at either end of the orifice disposed in the surrounding saline solution. An individual cell moving through the orifice displaces some of the conductive fluid in the orifice. Because the conductivity of the cell is less than that of the fluid it displaces, the resistance of the orifice contents increase due to the presence of the cell. Electrical circuits connected to the electrodes sense this change of resistance and produce a pulse signal. In such a device, the desired signal from the cell mixes with undesired noise signals which originate outside of the orifice, because the sensing electrodes are disposed outside of the orifice. In contrast, the present invention utilizes sensing electrodes disposed within the orifice, itself. Therefore differential amplification of the potential sensed within the orifice yields a pulse signal which is free of many outside noise disturbances.

SUMMARY OF THE INVENTION

In accordance with the present invention, there is provided an apparatus and method for electrical potential sensing cellular analysis. A preferred embodiment of the invention utilizes a container holding saline solution in which cells to be analyzed are suspended. Immersed in the container is a novel orifice comprising a plurality of electrodes, communicating with the walls of the orifice and across which an electrical potential is sensed. The entrance of the orifice communicates with cell-containing saline solution in the container and the exit of the orifice communicates with a device for evacuating cell-containing saline solution through the orifice. A high impedance differential amplifier connects across the electrodes' outputs to a pulse height analyzer and a recording or displaying device.

As the evacuation device draws saline solution containing the cells from the container through the orifice, individual cells passing through the orifice vary the resistance within the orifice and hence the potential across the two electrodes. This potential variance is picked up by the high impedance differential amplifier and amplified to create a pulse signal for the pulse height analyzer, the output of which may be displayed or recorded.

One object of the present invention is to improve automatic cellular analysis by providing an output signal having a much larger signal-to-noise ratio than that provided with prior art sensing devices.

Another object of the present invention is to allow the use of a larger orifice than prior art electrical cellular analysis devices, thus reducing any clogging tendency of the orifice.

Another object of the present invention is to provide a larger orifice so that larger cells can be sensed than with prior art devices.

Still another object of the present invention is to achieve high counting rates by providing signals having narrow pulse widths in comparison with pulse widths achievable with prior art devices.

One advantage in practicing the present invention is that because of the large orifice and narrow pulse width signals, more cells can be counted per unit time than with prior art devices.

Another advantage of the present invention is that larger cells can be counted than with prior art devices.

Yet another advantage of the present invention is that the clogging problem of prior art devices is substantially reduced.

Yet still another advantage of the present invention is that a higher signal-to-noise ratio is achievable in accordance therewith than with prior art apparatus and methods.

Other objects and advantages of the present invention will be apparent to those skilled in the art from the following description with reference to the appended drawings wherein like numbers denote like parts and wherein:

FIG. 1 schematically illustrates an apparatus in accordance with the invention;

FIG. 2 is a top view of a preferred embodiment of the potential sensing orifice of the invention; and FIG. 3 is a cutaway cross sectional view of the FIG. 2 embodiment of the orifice of the invention.

DETAILED DESCRIPTION OF THE INVENTION

Figure 1:
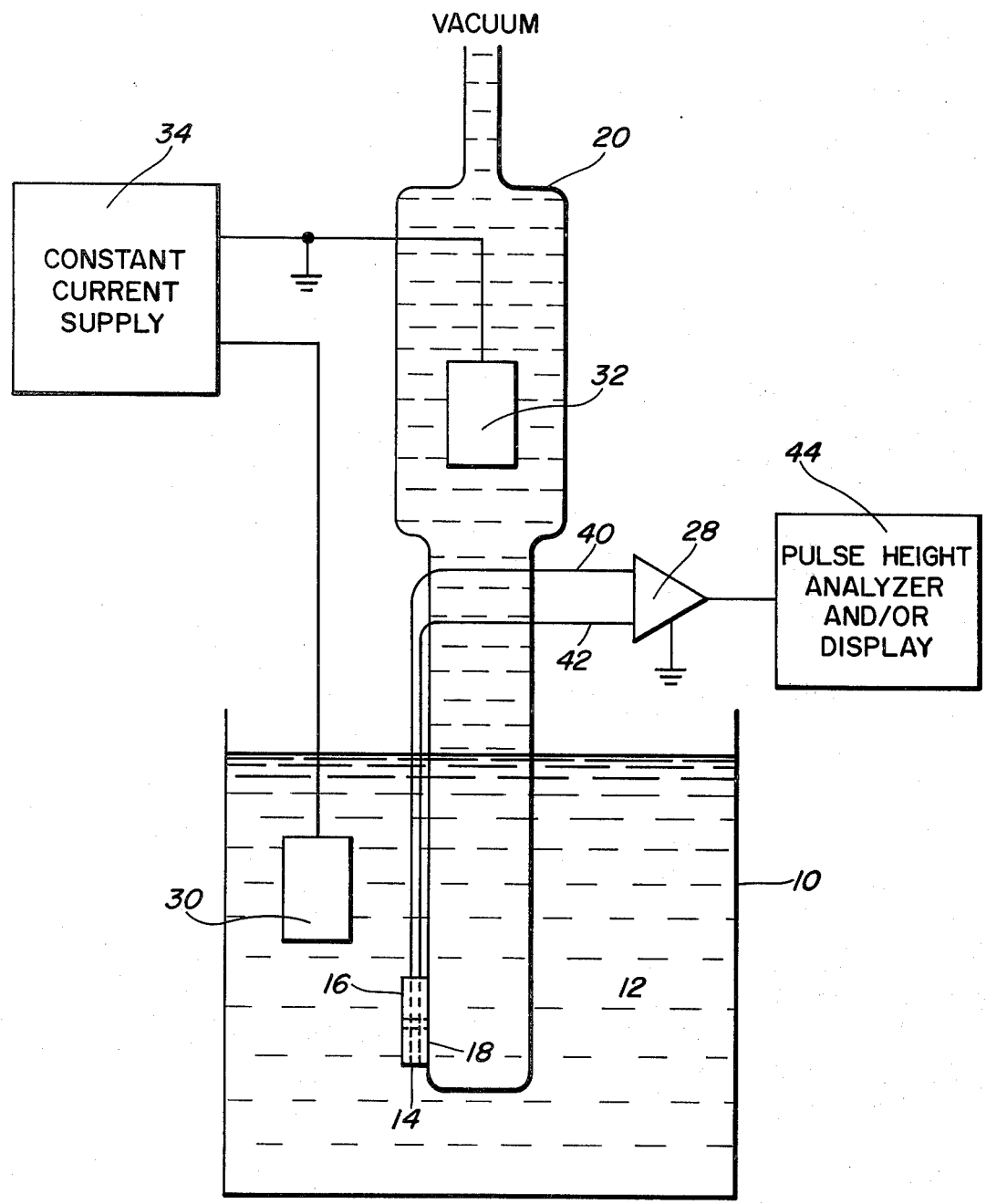

Reference is now made to FIG. 1 which shows a potential sensing cellular analyzer in accordance with a preferred embodiment of the invention. As shown therein, a container 10 holds saline solution 12 in which cells to be analyzed are suspended. An orifice containing block 14 is immersed within solution 12. The entrance side 16 of orifice block 14 communicates with the saline solution 12 in container 10. The exit side 18 of orifice block 14 communicates with a device 20 for drawing cell containing saline solution 12 from the container 10 through the orifice. Preferably, a vacuum applied to device 20 draws solution 12 into device 20.

Figure 2:
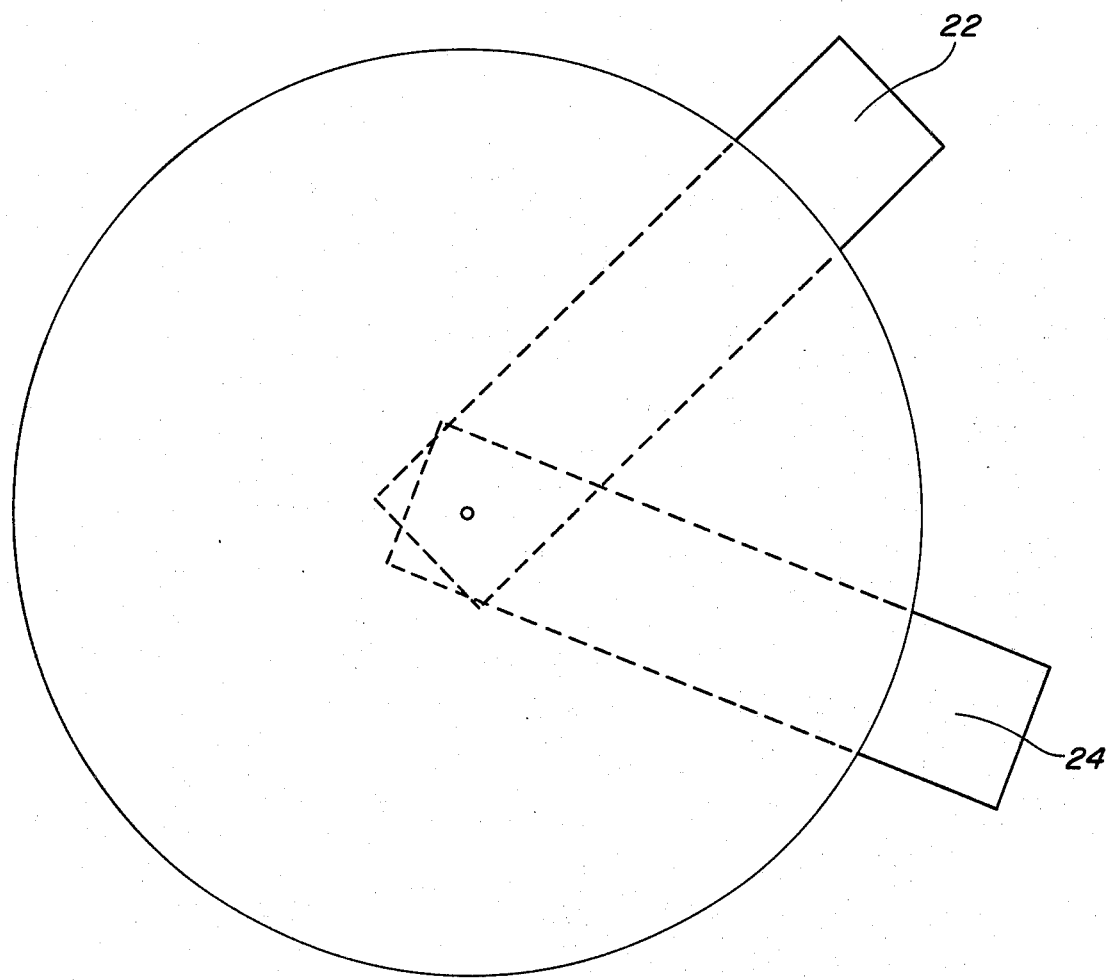
Figure 3:
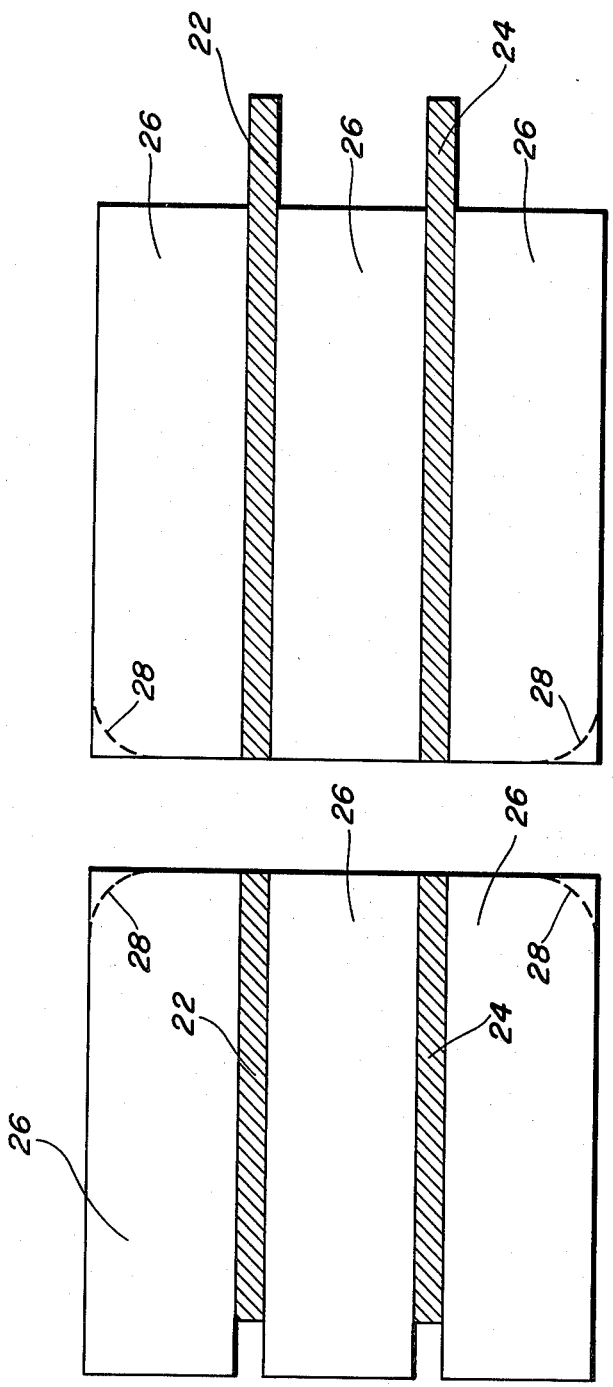

Block 14 as can be seen in FIGS. 2 and 3 comprises separated electrodes 22 and 24 laminated between layers of a dielectric 26, which can be, for example, a plastic. It will be appreciated by those skilled in the art that the electrode structure shown in FIGS. 2 and 3 is by way of example only and the invention is not limited thereto. For example, a plurality of electrodes of three or more may be used and a variety of dielectrical layers can also be constructed. Too, the electrodes may partially rather than completely encircle the orifice. As indicated, the electrodes preferably comprise platinum but other metals such as silver or copper may be used. Platinum is preferred because it resists corrosion rather well. In the exemplary embodiment of FIGS. 2 and 3, the orifice measures 87 micrometers across and 412 micrometers long, and the region between electrodes 22 and 24 measures 144 micrometers long. As can be seen in FIG. 3, the entrance and exit of the orifice may be right angular. However, volume resolution is reduced with such an orifice because cells in different positions in relation to the longitudinal axis of the orifice flow at different rates through the orifice. The flow rates of cells at or near the central axis are faster than the flow rates of cells nearer the walls of the orifice. In typical prior art orifices, the diameters of the entrances and exits of the orifices are relatively wide with the diameter continuously narrowing toward some internal point at which it is sufficiently small to provide good flow characteristics past the area of measurement. In the preferred embodiment of an orifice in accordance with the invention, as shown in FIG. 2, the orifice is relatively large. Therefore, orifice geometry is not critical. However, it is still advantageous to channel cells down the center of the orifice to insure more accurate volumetric measurements (volumetric resolution). This is because the pulse widths of the signals produced in response to cell volume are dependent on cell flow rate. Therefore, those cells at or near the center of a particular orifice produce signals having narrower pulse widths than those cells away from the center which flow slower— naturally, the narrower the pulse width the higher the cell count rates obtainable. It will therefore be apparent to those skilled in the art that although the entrances and exits of the orifices of the invention may be right angular, if they are curved as indicated by dashed lines 28 in FIG. 3 or continuously structured such as in the prior art, the better flow characteristics achieved will assist in providing consistently narrow pulse widths in the signals produced.

FIG. 2 shows dielectric material in the shape of circular discs having a diameter of 1 centimeter and rectangular sheet platinum electrodes intersecting across the orifice. This geometry is merely for the sake of convenience and the invention is clearly not limited thereto. Any geometrical configuration yielding properly spaced electrodes and dielectric layers may be utilized in accordance with the invention.

Referring now back to FIG. 1 and the apparatus for utilizing the orifice, it can be seen that block 14 is mounted so that the orifice is in a horizontal position. The orifice may alternatively be mounted with any amount of incline to the horizontal desired such as in a vertical or other such position to provide good access to the cells in the saline solution.

To maintain a potential difference between the saline solution in container 10 and that within device 20, electrodes 30 and 32 are provided. A constant current supply 34 delivers current which flows through the orifice between electrodes 30 and 32. A high impedance differential amplifier 28 receives signals from orifice electrodes 14 and 16 through leads 40 and 42 and outputs the amplified signal to a pulse height analyzer, and a display or recording device represented by block 44.

In operation, cell-containing saline solution 12 passes through the orifice into device 20 drawn by a vacuum applied thereto. As a cell passes through the region between electrodes 22 and 26, it varies the potential across electrodes 22 and 24 because its conductivity is different than that of the saline solution itself. The change in conductivity is proportional to the volume of the cell. This conductivity difference causes a change in resistance of the orifice because of the cell's presence within the orifice. The orifice resistance change $\Delta r$ multiplied by the orifice constant current I from supply 34 gives the potential change $\Delta V = I \Delta r$. The potential difference ($\Delta V$) passes to the high impedance differential amplifier 28 sends the amplified difference signal to a pulse height analyzer and recording or display device 44.

As is well known to those skilled in the art, in prior art devices the pulse width produced is directly proportional to the total length of the orifice. This is because the pulse width is proportional to the time of transit of the cell through the orifice. In accordance with the present invention, the pulse width is directly proportional to the spacing between electrodes 22 and 24 which can be made quite small, i.e., of a size to produce signals having pulse widths of from about 1 microsecond to about 5 microseconds. However, for a given diameter orifice, the closer the electrodes the smaller will be the pulse height of the signal produced. Of course, the electrodes could be positioned far apart across the length of the orifice, being disposed at its entrance and exit.

The invention allows for the use a desirable long orifice therewith because electrodes are disposed inside the orifice walls and may be positioned quite close together. In the prior art orifice having external electrodes, the longer the orifice, the wider the pulses produced. So if a long orifice was used to get good flow characteristics, we had to broaden the pulse width, thereby decreasing the counting rate attainable. A long orifice is desirable because it smooths out turbulence and other non-linearities affecting the cell movements before readings are taken. In accordance with the invention, orifice diameter is preferably from between about 30 micrometers to about 250 micrometers and orifice length is from about 100 micrometers to about 500 micrometers.

The various features and advantages of the invention are thought to be clear from the foregoing description.

However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A cell sensing apparatus comprising:

first container means for retaining a volume of liquid solution in which cells are suspended;

second container means partially disposed within said first container means;

means comprising a walled orifice through which said cell suspending liquid may be drawn from said first container means into said second container means, said walled orifice comprising a first layer of insulating material, a first electrode, a second layer of insulating material, a second electrode, and a third layer of insulating material, each of said layers and electrodes having a concentrically aligned aperture, said aperture being of sufficient diameter to allow passage therethrough of said cells;

a constant current supply;

a third and fourth electrode means connected to said supply means for sensing a change in the potential difference between said first and second electrodes caused by at least one cell passing through the orifice, indicating the presence of said cell within said orifice.

2. The invention of claim 1 wherein said electrodes comprise portions of the walls of said orifice.

3. The invention of claim 1 wherein said electrodes comprise sheets of electrically conducting material sandwiched between sheets of dielectric material so that alternating conducting and insulating layers at least partially circumscribe said orifice.

4. The invention of claim 3 wherein at least one electrically conducting sheet is positively charged and at least one electrically conducting sheet is negatively charged, said positively charged and negatively charged sheets separated by at least one dielectric sheet.

5. The invention of claim 1 wherein the diameter of said orifice is several times the maximum width of any of said cells.

6. The invention of claim 1 wherein said sensing means comprises means for quantitatively sensing the change in potential caused by the presence of said cell within said aperture and means for producing an output signal in accordance with said change in potential to thereby provide an indication of the volume of said cell.

* * * * *